United States Patent [19]
Huseby et al.

[11] Patent Number: 4,818,455
[45] Date of Patent: * Apr. 4, 1989

[54] HIGH THERMAL CONDUCTIVITY CERAMIC BODY

[75] Inventors: Irvin C. Huseby, Schenectady; Carl F. Bobik, Burnt Hills, both of N.Y.

[73] Assignee: General Electric Company, Schenectady, N.Y.

[*] Notice: The portion of the term of this patent subsequent to Mar. 25, 2003 has been disclaimed.

[21] Appl. No.: 868,490

[22] Filed: May 30, 1986

[51] Int. Cl.$^4$ .................. C04B 35/58; F27D 7/06
[52] U.S. Cl. ................................ 264/65; 264/61; 264/63; 264/66; 501/96; 501/98
[58] Field of Search .............. 501/96, 97, 98, 152, 501/153; 264/65, 66, 61, 63

[56] References Cited

U.S. PATENT DOCUMENTS

| | | | |
|---|---|---|---|
| 3,108,887 | 8/1963 | Lenie et al. | 501/97 |
| 3,833,389 | 9/1974 | Komeya et al. | 501/96 |
| 4,097,293 | 6/1978 | Komeya et al. | 501/98 |
| 4,203,733 | 5/1980 | Tanaka et al. | 51/295 |
| 4,435,513 | 3/1984 | Komeya et al. | 501/96 |
| 4,478,785 | 10/1984 | Huseby et al. | 264/65 |
| 4,618,592 | 10/1986 | Kuramoto et al. | 501/96 |

FOREIGN PATENT DOCUMENTS

| | | |
|---|---|---|
| 3313836 | 10/1984 | Fed. Rep. of Germany. |
| 49-19686 | 3/1974 | Japan. |
| 2132911 | 7/1984 | United Kingdom. |

OTHER PUBLICATIONS

Kuramoto et al., "Transparent AlN Ceramics", Journal of Materials Science Letters, 3 (Jun. 1984), pp. 471–474.
"Thermophysical Properties of Aluminum Nitride-Yttria Materials", Litvinenko et al., translated from Poroshkovaya Metallurgiva, No. 6 (246), pp. 77–79, Jun. 1983, pp. 490–492.
"Sintering of Aluminum Nitride with Low Oxide Addition", Schultz et al, Progress in Nitrogen Ceramics (1983), pp. 245–252.
"Development of a High Thermal Conductive AlN Ceramic Substrate Technology", Iwase et al, The International Journal for Hybrid Microelectronics, vol. 7, #4, Dec. 1984.
K. Shinozaki et al., "Sintering Behavior and Thermal Characteristics of Pressureless Sintered AlN with $Y_2O_3$ Addition", 22nd Symposium on Basic Science of Ceramics, Yogyo-Kyokai, Jan. 1984, one page in Japanese, two pages of translation, believed to be published sometime after 1/84 but exact date of publication unknown.
August, Bulletin of American Ceramic Society, vol. 63, No. 8 (1984), p. 1009. As far as we know, this talk has not been published.
Werdecker, W. et al.–"Aluminum Nitride–An Alternative Ceramic Substrate for High Power Applications in Micro Circuits", pp. 402–406, IEEE, May 1984.

(List continued on next page.)

Primary Examiner—William R. Dixon, Jr.
Assistant Examiner—Ann M. Knab
Attorney, Agent, or Firm—Jane M. Binkowski; James C. Davis, Jr.; James Magee, Jr.

[57] ABSTRACT

A process for producing an aluminum nitride ceramic body having a composition defined and encompassed by polygon ABCFGH of FIG. 2, a porosity of less than about 10% by volume, and a thermal conductivity greater than 0.70 W/cm.K at 25° C. which comprises forming a mixture comprised of aluminum nitride powder containing oxygen, gadolinium oxide, and free carbon, shaping said mixture into a compact, said mixture and compact having a composition wherein the equivalent % of gadolinium and aluminum ranges from point A to point F of FIG. 2, said mixture and said compact having an equivalent % composition of Gd, Al, O and N outside the composition defined and encompassed by polygon ABCFGH of FIG. 2, heating said compact to a temperature at which its pores remain open reacting said free carbon with oxygen contained in said aluminum nitride producing a deoxidized compact, said deoxidized compact having a composition wherein the equivalent % of Al, Gd, O and N is defined and encompassed by polygon ABCFGH of FIG. 2, and sintering said deoxidized compact producing said ceramic body.

22 Claims, 2 Drawing Sheets

OTHER PUBLICATIONS

Werdecker, W. et al.-"High Performance Aluminum Nitride Substrate by Tape Casting Technology", pp. 26-31, 35th *Electronic Comp.* Conf., Washington, D.C., May 1985.

Meshcheryakov, N. A. et al.-"The Structure of Aluminonitride Ceramic With Added Nickel and Yttrium Oxide", pp. 1545-1548, Translation from Izvestiya Akademii Nauk SSSR, Neorganicheskie Materialy, vol. 16, No. 12, pp. 2240-2243, Dec. 1980.

Shinozaki, K. et al.-"Sintering Characteristics and Thermal Conductivity of $Y_2O_3$-Added AlN Sintered Under Normal Pressure", Toshiba Central Research Laboratory, have not been able to determine publication date, p. 43 & translation of 2 pages.

Gauthier, G. et al.-"Influence of Very Low Additions of CaO and $Y_2O_3$ on the Densification of Aluminum Nitride by Hot-Pressing Between 1650° C. and 1750° C.", C. R. Acad. Sc., Paris, t. 301, Series II, No. 3, 1985, pp. 135-138 & Translation of 7 pages.

Heraeus PS-B-80, 4 pages-Have not been able to find publication date.

"Effects of Various Additives on Sintering of Aluminum Nitride", Komeya et al-before 1983.

"Science of Ceramics", vol. 6, 1973, pp. XX/3-XX13.

Komeya et al, Trans. & J. Brit. Ceram. Soc., 70 (3), pp. 107-113 (1971), "The Influence of Fibrous Aluminum Nitride on the Strength of Sintered AlN-$Y_2O_3$".

Advanced Optical Ceramics, Phase III, Final Report, DIN:82SDR2006, Feb. 1982, pp. 4-68 to 4-80 and pp. 4-127 to 4-137.

"Nonmetallic Crystals With High Thermal Conductivity", G. A. Slack, J. Phys. Chem. Solids, 1973, vol. 34, pp. 321-335.

HIGH THERMAL CONDUCTIVITY CERAMIC BODY

The following patents and applications were filed in the names of Irvin Charles Huseby and Carl Francis Bobik and are assigned to the assignee hereof and are incorporated herein by reference:

U.S. Pat. Nos. 4,478,785 and 4,533,645 disclose a process comprising forming a mixture of aluminum nitride powder and free carbon wherein the aluminum nitride has a predetermined oxygen content higher than about 0.8% by weight and wherein the amount of free carbon reacts with such oxygen content to produce a deoxidized powder or compact having a certain oxygen content, heating the mixture or a compact thereof to react the carbon and oxygen producing the deoxidized aluminum nitride, and sintering a compact of the deoxidized aluminum nitride producing a ceramic body having a thermal conductivity greater than 0.5 W/cm·K at 22° C.

U.S. Pat. No. 4,547,471 discloses a process for producing a sintered aluminum nitride ceramic body having a composition defined and encompassed by line ABCDEFA but not including lines CD and EF of FIG. 1 therein and a thermal conductivity greater than 1.0 W/cm·K at 22° C. which comprises forming a mixture comprised of aluminum nitride powder and an yttrium additive selected from the group consisting of yttrium, yttrium hydride, yttrium nitride and mixtures thereof, said aluminum nitride and yttrium additive having a predetermined oxygen content, said mixture having a composition wherein the equivalent % of yttrium, aluminum, nitrogen and oxygen is defined and encompassed by line ABCDEF but not including lines CD and EF in FIG. 1, therein shaping said mixture into a compact, and sintering said compact.

U.S. Pat. No. 4,578,234 discloses a process for producing an aluminum nitride ceramic body having a composition defined and encompassed by polygon JKLM but not including line MJ of FIG. 4 therein which comprises forming a mixture comprised of aluminum nitride powder containing oxygen, yttrium oxide, and free carbon, shaping said mixture into a compact, said mixture and said compact having a composition wherein the equivalent % of yttrium and aluminum ranges from point L to less than point J of FIG. 4 therein, said compact having an equivalent % composition of Y, Al, O and N outside the composition defined and encompassed by polygon JKLM of FIG. 4 therein, heating said compact up to a temperature at which its pores remain open reacting said free carbon with oxygen contained in said aluminum nitride producing a deoxidized compact, said deoxidized compact having a composition wherein the equivalent % of Al, Y, O and N is defined and encompassed by polygon JKLM but not including line MJ of FIG. 4 therein, and sintering said deoxidized compact.

U.S. Pat. No. 4,578,233 discloses a process for producing an aluminum nitride ceramic body having a composition defined and encompassed by polygon FJDSR but not including line RF of FIG. 4 therein which comprises forming a mixture comprised of aluminum nitride powder containing oxygen, yttrium oxide, and free carbon, shaping said mixture into a compact, said mixture and said compact having a composition wherein the equivalent % of yttrium and aluminum ranges from point D up to point F of FIG. 4 therein, said compact having an equivalent % composition of Y, Al, O and N outside the composition defined and encompassed by polygon FJDSR of FIG. 4 therein, heating said compact up to a temperature at which its pores remain open reacting said free carbon with oxygen contained in said aluminum nitride producing a deoxidized compact, said deoxidized compact having a composition wherein the equivalent % of Al, Y, O and N is defined and encompassed by polygon FJDSR but not including line RF of FIG. 4 therein, and sintering said deoxidized compact.

U.S. Pat. No. 4,578,365 discloses a process for producing an aluminum nitride ceramic body having a composition defined and encompassed by polygon P1N1KJ but not including lines KJ and P1J of FIG. 4 therein which comprises forming a mixture comprised of aluminum nitride powder containing oxygen, yttrium oxide, and free carbon, shaping said mixture into a compact, said mixture and said compact having a composition wherein the equivalent % of yttrium and aluminum ranges between points K and P1 of FIG. 4 therein, said compact having an equivalent % composition of Y, Al, O and N outside the composition defined and encompassed by polygon P1N1KJ of FIG. 4 therein, heating said compact up to a temperature at which its pores remain open reacting said free carbon with oxygen contained in said aluminum nitride producing a deoxidized compact, said deoxidized compact having a composition wherein the equivalent % of Al, Y, O and N is defined and encompassed by polygon P1N1KJ but not including lines KJ and P1J of FIG. 4 therein, and sintering said deoxidized compact.

U.S. Pat. No. 4,578,364 discloses a process for producing an aluminum nitride ceramic body having a composition defined and encompassed by polygon P1JFA4 but not including lines JF and A4F of FIG. 4 therein which comprises forming a mixture comprised of aluminum nitride powder containing oxygen, yttrium oxide, and free carbon, shaping said mixture into a compact, said mixture and said compact having a composition wherein the equivalent % of yttrium and aluminum ranges between points J and A4 of FIG. 4 therein, said compact having an equivalent % composition of Y, Al, O and N outside the composition defined and encompassed by polygon P1JFA4 of FIG. 4 therein, heating said compact to a temperature at which its pores remain open reacting said free carbon with oxygen contained in said aluminum nitride producing a deoxidized compact, said deoxidized compact having a composition wherein the equivalent % of Al, Y, O and N is defined and encompassed by polygon P1JFA4 but not including lines JF and A4F of FIG. 4 therein, and sintering said deoxidized compact.

U.S. Pat. No. 4,578,232 discloses a process for producing an aluminum nitride ceramic body having a composition defined and encompassed by polygon LT1DM but not including lines LM and DM of FIG. 4 therein which comprises forming a mixture comprised of aluminum nitride powder containing oxygen, yttrium oxide, and free carbon, shaping said mixture into a compact, said mixture and said compact having a composition wherein the equivalent % of yttrium and aluminum ranges from point T1 up to point M of FIG. 4 therein, said compact having an equivalent % composition of Y, Al, O and N outside the composition defined and encompassed by polygon LT1DM of FIG. 4 therein, heating said compact to a temperature at which its pores remain open reacting said free carbon with oxygen contained in said aluminum nitride producing a deoxidized compact, said deoxidized compact having a composition wherein the equivalent % of Al, Y, O and N is defined and encompassed by polygon LTIDM but not including lines LM and DM of FIG. 4 therein, and sintering said deoxidized compact.

Copending U.S. patent application Ser. No. 810,473 filed on Dec. 18, 1985 discloses a process for producing an aluminum nitride ceramic body having a composition defined and encompassed by polygon A4F5F6F4 but excluding line F6F4 of FIG. 4 therein which comprises forming a mixture comprised of aluminum nitride powder containing oxygen, yttrium oxide, and free carbon, shaping said mixture into a compact, said mixture and said compact having a composition wherein the equivalent % of yttrium and aluminum ranges from point F5 up to point F4 of FIG. 4 therein, said compact having an equivalent % composition of Y, Al, O and N outside the composition defined and encompassed by polygon A4F5F6F4 of FIG. 4 therein, heating said compact to a temperature at which its pores remain open reacting said free carbon with oxygen contained in said aluminum nitride producing a deoxidized compact, said deoxidized compact having a composition wherein the equivalent % of Al, Y, O and N is defined and encompassed by polygon A4F5F6F4 but excluding line F6F4 of FIG. 4 therein, and sintering said deoxidized compact.

Copending U.S. Ser. No. 845,954, now U.S. Pat. No. 4,764,321 filed on Mar. 28, 1986 discloses a process for producing an aluminum nitride ceramic body having a composition defined and encompassed by polygon ABCDEFGH excluding line DE of FIG. 2 therein which coprises forming a mixture comprised of aluminum nitride powder containing oxygen, an Ln oxide selected from the group consisting essentially of erbium oxide, holmium oxide, a mixture and solid solution thereof, and free carbon, shaping said mixture into a compact, said mixture and compact having a composition wherein the equivalent % of Ln and aluminum ranges from point A up to point E of FIG. 2 therein, said mixture and said compact having an equivalent % composition of Ln, Al, O and N outside of the composition defined and encompassed by polygon ABCDEFGH of FIG. 2 therein, heating said compact to a temperature at which its pores remain opening reacting said free carbon with oxygen contained in said aluminum nitride producing a deoxidized compact, said deoxidized compact having a composition wherein the equivalent % of Al, Ln, O and N is defined and encompassed by polygon ABCDEFGH excluding line DE of FIG. 2 therein, and sintering said deoxidized compact.

The present invention relates to the production of a liquid phase sintered polycrystalline aluminum nitride body having a thermal conductivity higher than 0.70 W/cm·K at 25° C. In one aspect of the present process, aluminum nitride is deoxidized by carbon to a certain extent, and then it is further deoxidized and/or sintered by utilizing gadolinium oxide, $Gd_2O_3$, to produce the present ceramic.

A suitably pure aluminum nitride single crystal, containing 300 ppm dissolved oxygen, has been measured to have a room temperature thermal conductivity of 2.8 W/cm·K, which is almost as high as that of BeO single crystal, which is 3.7 W/cm·K, and much higher than that of $\alpha\text{-}Al_2O_3$ single crystal, which is 0.44 W/cm·K. The thermal conductivity of an aluminum nitride single crystal is a strong function of dissolved oxygen and decreases with an increase in dissolved oxygen content. For example, the thermal conductivity of aluminum nitride single crystal having 0.8 wt % dissolved oxygen, is about 0.8 W/cm·K.

Aluminum nitride powder has an affinity for oxygen, especially when its surface is not covered by an oxide. The introduction of oxygen into the aluminum nitride lattice in aluminum nitride powder results in the formation of Al vacancies via the equation:

$$3N^{-3} \longrightarrow 3O^{-2} + V \quad (1)$$
$$(N^{-3}) \quad (N^{-3}) \quad (Al^{+3})$$

Thus, the insertion of 3 oxygen atoms on 3 nitrogen sites will form one vacancy on an aluminum site. The presence of oxygen atoms on nitrogen sites will probably have a negligible influence on the thermal conductivity of AlN. However, due to the large difference in mass between an aluminum atom and a vacancy, the presence of vacancies on aluminum sites has a strong influence on the thermal conductivity of AlN and, for all practical purposes, is probably responsible for all of the decrease in the thermal conductivity of AlN.

There are usually three different sources of oxygen in nominally pure AlN powder. Source #1 is discrete particles of $Al_2O_3$. Source #2 is an oxide coating, perhaps as $Al_2O_3$, coating the AlN powder particles. Source #3 is oxygen in solution in the AlN lattice. The amount of oxygen present in the AlN lattice in AlN powder will depend on the method of preparing the AlN powder. Additional oxygen can be introduced into the AlN lattice by heating the AlN powder at elevated temperatures. Measurements indicate that at ~1900° C. the AlN lattice can dissolve ~1.2 wt % oxygen. In the present invention, by oxygen content of AlN powder, it is meant to include oxygen present as sources #1, #2 and #3. Also, in the present invention, the oxygen present with AlN powder as sources #1, #2 and #3 may be removed by utilizing free carbon, and the extent of the removal of oxygen by carbon depends largely on the composition desired in the resulting sintered body.

According to the present invention, aluminum nitride powder can be processed in air and still produce a ceramic body having a thermal conductivity greater than 0.70 W/cm·K at 25° C.

In one embodiment of the present invention, the aluminum nitride in a compact comprised of particulate aluminum nitride of known oxygen content, free carbon and gadolinium oxide, is deoxidized by carbon to produce a desired equivalent composition of Al, N, Gd and O, and the deoxidized compact is sintered by means of a liquid phase containing mostly Gd and O and a smaller amount of Al and N.

Those skilled in the art will gain a further and better understanding of the present invention from the detailed description set forth below, considered in conjunction with the figures accompanying and forming a part of the specification in which:

FIG. 1 is plotted in equivalent % and along each axis of ordinates the equivalent % of oxygen is shown (the equivalent % of nitrogen is 100% minus the equivalent % of oxygen). Along the axis of abscissas, the equivalent % of Gd is shown (the equivalent % of aluminum is 100% minus the equivalent % of Gd). In FIG. 1, polygon ABCFGH encompasses and defines the composition of the sintered body produced by the present process.

Figure 1:
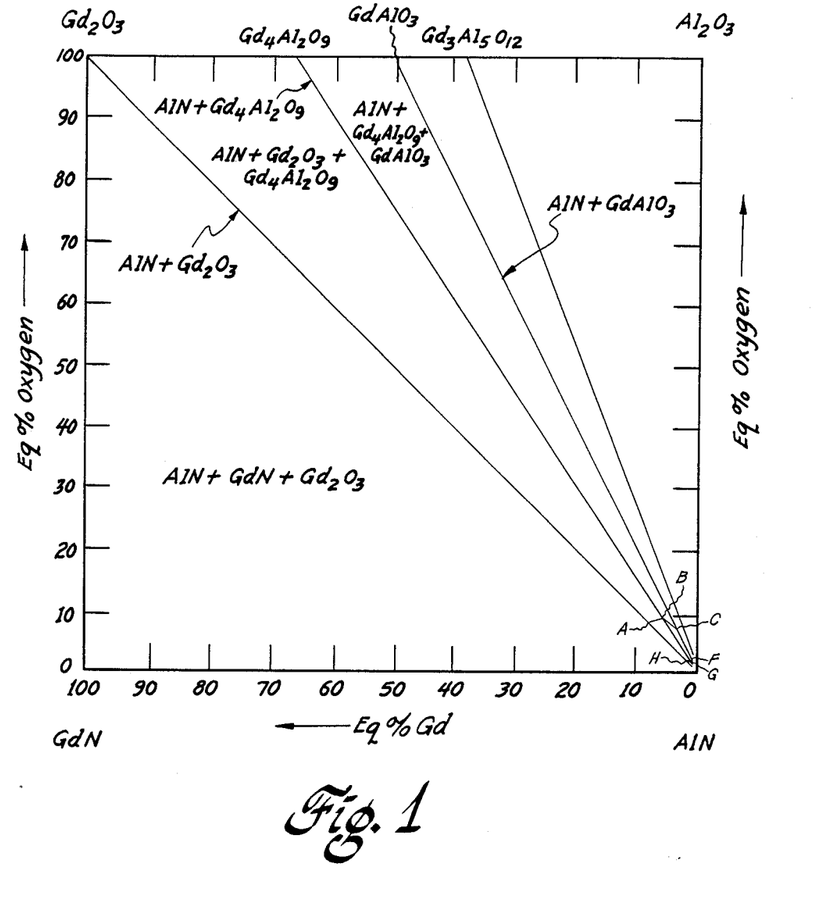
FIG. 1 is a composition diagram showing the subsolidus phase equilibria in the reciprocal ternary system comprised of AlN, GdN, $Gd_2O_3$ and $Al_2O_3$.
Figure 2:
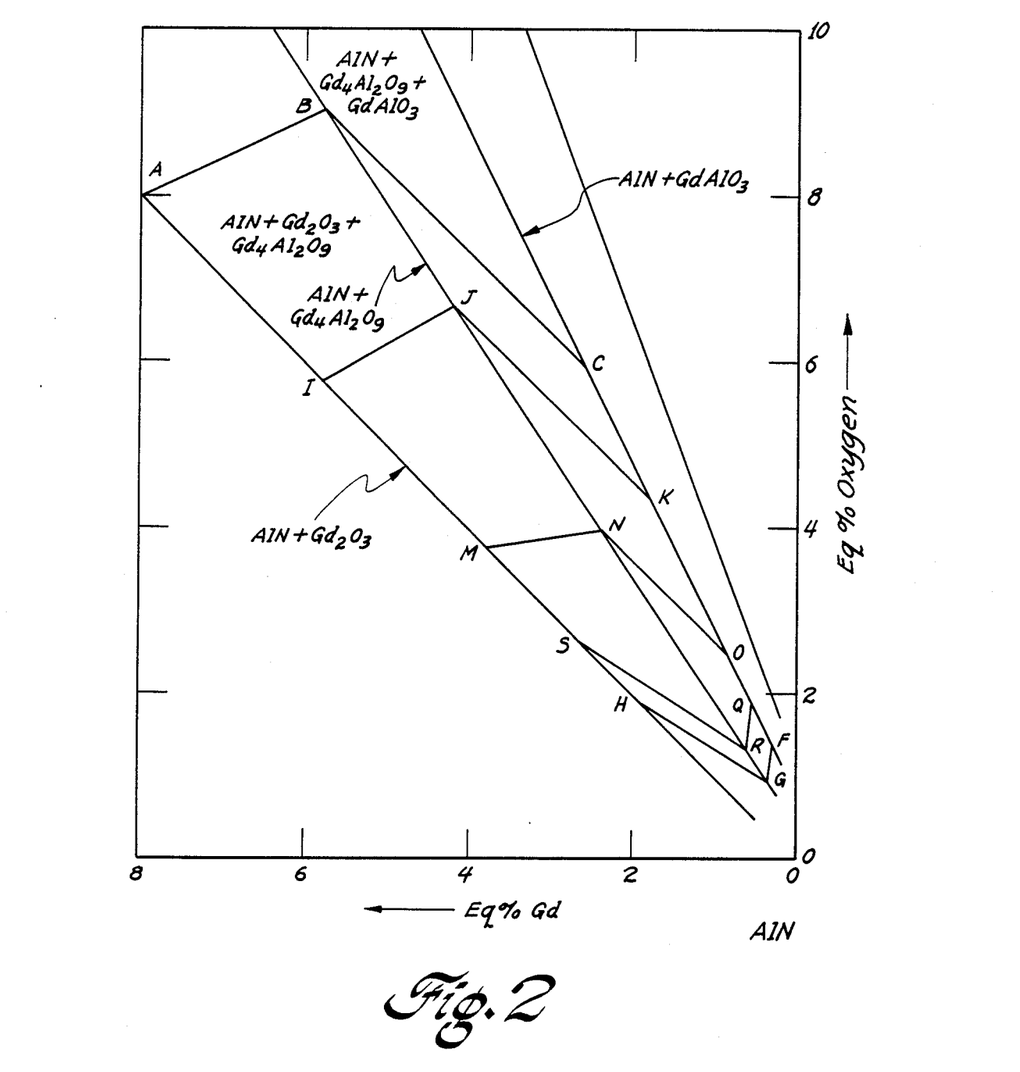
FIG. 2 is an enlarged view of the section of FIG. 1 showing the composition of the present polycrystalline body.

FIGS. 1 and 2 were developed algebraically on the basis of experimental data which included experiments with non-gadolinium compounds.

The best method to plot phase equilibria that involve oxynitrides and two different metal atoms, where the metal atoms do not change valence, is to plot the compositions as a reciprocal ternary system as is done in FIG. 1 In the particular system of FIG. 1 there are two types of non-metal atoms (oxygen and nitrogen) and two types of metal atoms (Gd and aluminum). The Al, Gd, oxygen and nitrogen are assumed to have a valence of $+3$, $+3$, $-2$, and $-3$, respectively. All of the Al, Gd, oxygen and nitrogen are assumed to be present as oxides, nitrides or oxynitrides, and to act as if they have the aforementioned valences.

The phase diagrams of FIGS. 1 and 2 are plotted in equivalent percent. The number of equivalents of each of these elements is equal to the number of moles of the particular element multiplied by its valence. Along the ordinate is plotted the number of oxygen equivalents multiplied by 100% and divided by the sum of the oxygen equivalents and the nitrogen equivalents. Along the abscissa is plotted the number of Gd equivalents multiplied by 100% and divided by the sum of the Gd equivalents and the aluminum equivalents. All compositions of FIGS. 1 and 2 are plotted in this manner.

Compositions on the phase diagrams of FIGS. 1 and 2 can be used to determine the weight percent and the volume percent of the various phases. For example, a particular point in the polygon ABCFGH in FIG. 2 can be used to determine the phase composition of the polycrystalline body at that point.

FIGS. 1 and 2 show the composition and the phase equilibria of the polycrystalline body in the solid state.

Briefly stated, the present process for producing the present sintered polycrystalline aluminum nitride ceramic body having a composition defined and encompassed by polygon ABCFGH of FIGS. 1 or 2, a porosity of less than 10% by volume, and a thermal conductivity greater than 0.70 W/cm·K at 25° C. comprises the steps:

(a) forming a mixture comprised of aluminum nitride powder containing oxygen, a gadolinium oxide or precursor therefor and a carbonaceous additive selected from the group consisting essentially of free carbon, a carbonaceous organic material and mixtures thereof, said carbonaceous organic material thermally decomposing at a temperature ranging from about 50° C. to about 1000° C. to free carbon and gaseous product of decomposition which vaporizes away, shaping said mixture into a compact, said mixture and said compact having a composition wherein the equivalent % of Gd and aluminum ranges from point A to point F of FIG. 2, which is from about 8.0 equivalent % to about 0.3 equivalent % gadolinium and from about 92.0 equivalent % to about 99.7 equivalent % aluminum, said mixture and said compact having an equivalent % composition of Gd, Al, O and N outside the composition defined and encompassed by polygon ABCFGH of FIG. 2, (b) heating said compact in a nonoxidizing atmosphere at a temperature up to about 1200° C. thereby providing gadolinium oxide and free carbon, (c) heating said compact in a nitrogen-containing nonoxidizing atmosphere at a temperature ranging from about 1350° C. to a temperature sufficient to deoxidize the compact but below its pore closing temperature reacting said free carbon with oxygen contained in said aluminum nitride producing a deoxidized compact, said deoxidized compact having a composition wherein the equivalent % of Al, Gd, O and N is defined and encompassed by polygon ABCFGH of FIG. 2, said free carbon being in an amount which produces said deoxidized compact, and (d) sintering said deoxidized compact in a nitrogen-containing nonoxidizing atmosphere at a minimum temperature of about 1840° C. producing said polycrystalline body.

In the present process, the composition of the deoxidized compact in equivalent % is the same as or does not differ significantly from that of the resulting sintered body in equivalent %.

In the present invention, oxygen content can be determined by neutron activation analysis.

By weight % or % by weight of a component herein, it is meant that the total weight % of all the components is 100%.

By ambient pressure herein, it is meant atmospheric or about atmospheric pressure.

By specific surface area or surface area of a powder herein, it is meant the specific surface area according to BET surface area measurement.

In another embodiment of the present process, said mixture and said compact have a composition wherein the equivalent % of gadolinium and aluminum ranges from point A up to point Q of FIG. 2, i.e., said gadolinium ranging from about 8.0 equivalent % to greater than about 0.55 equivalent % and said aluminum ranging from about 92.0 equivalent % to less than about 99.45 equivalent %, said mixture and said compact having an equivalent % composition of Gd, Al, O and N outside the composition defined and encompassed by polygon ABCQRS of FIG. 2, and said sintered body and said deoxidized compact are comprised of a composition wherein the equivalent percent of Al, Gd, O and N is defined and encompassed by polygon ABCQRS excluding line CQ of FIG. 2.

In another embodiment of the present process, said mixture and said compact have a composition wherein the equivalent % of gadolinium and aluminum ranges from point I up to point Q but excludes line KQ of FIG. 2, i.e., said gadolinium ranging from about 5.75 equivalent % to greater than about 0.55 equivalent % and said aluminum ranging from about 94.25 equivalent % to less than about 99.45 equivalent %, said mixture and said compact having an equivalent % composition of Gd, Al, O and N outside the composition defined and encompassed by polygon IJKQRS of FIG. 2, and said sintered body and said deoxidized compact are comprised of a composition wherein the equivalent percent of Al, Gd, O and N is defined and encompassed by polygon IJKQRS but excluding line KQ of FIG. 2.

In yet another embodiment of the present process, said mixture and said compact have a composition wherein the equivalent % of Gd and aluminum ranges from point M up to point Q of FIG. 2, i.e., said gadolinium ranging from about 3.75 equivalent % to greater than about 0.55 equivalent % and said aluminum ranging from about 96.25 equivalent % to less than about 99.45 equivalent %, said mixture and said compact having an equivalent % composition of Gd, Al, O and N outside the composition defined and encompassed by polygon MNOQRS of FIG. 2, said sintered body and said deoxidized compact are comprised of a composition wherein the equivalent percent of Al, Gd, O and N is defined and encompassed by polygon MNOQRS excluding line OQ of FIG. 2, and said minimum sintering temperature is about 1850° C.

In another embodiment of the present process, said mixture and said compact have a composition wherein the equivalent % of gadolinium and aluminum ranges from point S up to point F of FIG. 2, i.e., said gadolinium ranging from about 2.4 equivalent % to greater than about 0.3 equivalent % and said aluminum ranging from about 97.6 equivalent % to less than about 99.7 equivalent %, said mixture and said compact having an equivalent % composition of Gd, Al, O and N, outside the composition defined and encompassed by polygon SRQFGH of FIG. 2, said sintered body and said deoxidized compact are comprised of a composition wherein the equivalent percent of Al, Gd, O and N is defined and encompassed by polygon SRQFGH, excluding line QF of FIG. 2, and said minimum sintering temperature ranges from about 1890° C. to about 1920° C.

In yet another embodiment of the present process, said mixture and said compact have a composition wherein the equivalent % of gadolinium and aluminum ranges from point K to point O of FIG. 2, i.e., said gadolinium ranging from about 1.8 equivalent % to about 0.8 equivalent % and said aluminum ranging from about 98.2 equivalent % to about 99.2 equivalent %, said mixture and said compact having an equivalent % composition of Gd, Al, O and N outside the composition defined by line KO of FIG. 2, and said sintered body and said deoxidized compact are comprised of a composition wherein the equivalent percent of Al, Gd, O and N is defined by line KO of FIG. 2.

In yet another embodiment of the present process, said mixture and said compact have a composition wherein the equivalent % of gadolinium and aluminum ranges from point O to point F of FIG. 2, i.e., said gadolinium ranging from about 0.8 equivalent % to about 0.3 equivalent % and said aluminum ranging from about 99.2 equivalent % to about 99.7 equivalent %, said mixture and said compact having an equivalent % composition of Gd, Al, O and N outside the composition defined by line OF, said deoxidized compact and said sintered body are comprised of a composition wherein the equivalent percent of Al, Gd, O and N is defined by line OF of FIG. 2, and said minimum sintering temperature is about 1850° C.

The calculated equivalent % compositions of particular points in polygon ABCFGH in FIG. 2 are shown in Table I as well as their corresponding phase compositions.

TABLE I

| Point | Composition (Equivalent %) | | Volume % of Phases | | | |
|---|---|---|---|---|---|---|
| | Gd | Oxygen | AlN | Gd$_2$O$_3$ | Gd$_4$Al$_2$O$_9$ | GdAlO$_3$ |
| A | 8.0 | 8.0 | 86.9 | 13.1 | — | — |
| B | 5.8 | 9.0 | 86.3 | — | 13.7 | — |
| C | 2.6 | 6.0 | 93.6 | — | — | 6.4 |
| F | 0.3 | 1.4 | 99.3 | — | — | 0.7 |
| G | 0.35 | 0.9 | 99.1 | — | 0.9 | — |
| H | 1.9 | 1.9 | 96.8 | 3.2 | — | — |
| I | 5.75 | 5.75 | 90.4 | 9.6 | — | — |
| J | 4.2 | 6.7 | 89.9 | — | 10.1 | — |
| K | 1.8 | 4.3 | 95.7 | — | — | 4.3 |
| M | 3.75 | 3.75 | 93.7 | 6.3 | — | — |
| N | 2.4 | 4.0 | 94.1 | — | 5.9 | — |

TABLE I-continued

| Point | Composition (Equivalent %) | | Volume % of Phases | | | |
|---|---|---|---|---|---|---|
| | Gd | Oxygen | AlN | Gd$_2$O$_3$ | Gd$_4$Al$_2$O$_9$ | GdAlO$_3$ |
| O | 0.8 | 2.4 | 97.9 | — | — | 2.1 |
| Q | 0.55 | 1.9 | 98.6 | — | — | 1.4 |
| R | 0.6 | 1.3 | 98.5 | — | 1.5 | — |
| S | 2.4 | 2.4 | 95.9 | 4.1 | — | — |

The polycrystalline aluminum nitride body produced by the present process has a composition defined and encompassed by polygon ABCFGH of FIG. 2. The sintered body of polygon ABCFGH of FIG. 2 is comprised of from about 8.0 equivalent % to about 0.3 equivalent % gadolinium, from about 92.0 equivalent % to about 99.7 equivalent % aluminum, from about 9.0 equivalent % to about 0.9 equivalent % oxygen and from about 91.0 equivalent % to about 99.1 equivalent % nitrogen.

Also, the polycrystalline body defined and encompassed by polygon ABCFGH of FIG. 2 is comprised of an AlN phase and a second phase which ranges in amount from about 0.7% by volume GdAlO$_3$ at point F to about 13.7% by volume of Gd$_4$Al$_2$O$_9$ at a composition at point B. As used herein, volume % or % by volume of a phase in the sintered body means by volume of the sintered body. The composition of the sintered body in FIG. 2 varies as its position in the polygon is varied.

On lines AH, BG and CF of FIG. 2, the sintered body is comprised of AlN and a second phase. The sintered body on line AH has a phase composition comprised of AlN and Gd$_2$O$_3$ with the amount of Gd$_2$O$_3$ decreasing as the composition moves from point A to point H. On line BG, the composition is comprised of AlN and Gd$_4$Al$_2$O$_9$ with the amount of Gd$_4$Al$_2$O$_9$ decreasing as the composition moves from point B to point G. On line CF, the phase composition is comprised of AlN and GdAlO$_3$ with the amount of GdAlO$_3$ decreasing as the composition moves from point C to point F.

In the area between lines AH and BG, the composition is comprised of AlN, Gd$_2$O$_3$ and Gd$_4$Al$_2$O$_9$ with the amount of Gd$_2$O$_3$ decreasing as the composition moves away from line AH toward line BG and with the amount of Gd$_4$Al$_2$O$_9$ decreasing as the composition moves away from line BG toward line AH. In the area between lines AH and BG, Gd$_2$O$_3$ and Gd$_4$Al$_2$O$_9$ are always present in at least a trace amount with Gd$_2$O$_3$ ranging to a maximum amount of less than about 13.1 volume % and Gd$_4$Al$_2$O$_9$ ranging to a maximum amount of less than about 13.7 volume %.

In the area between lines BG and CF, the composition is comprised of AlN, Gd$_4$Al$_2$O$_9$ and GdAlO$_3$ with the amount of Gd$_4$Al$_2$O$_9$ decreasing as the composition moves away from line BG toward line CF and with the amount of GdAlO$_3$ decreasing as the composition moves away from line CF toward line BG. In the area between lines BG and CF, Gd$_4$Al$_2$O$_9$ and GdAlO$_3$ are always present in at least a trace amount with Gd$_4$Al$_2$O$_9$ ranging to a maximum amount of less than about 13.7 volume % and GdAlO$_3$ ranging to a maximum amount of less than about 6.4 volume %.

The present polycrystalline sintered body having a composition defined and encompassed by polygon ABCFGH of FIG. 2 has a phase composition comprised of AlN and a Gd phase selected from the group consisting essentially of from about 3.2% by volume to about 13.1% by volume of $Gd_2O_3$, from about 0.9% by volume to about 13.7% by volume of $Gd_4Al_2O_9$, from about 0.7% by volume to about 6.4% by volume of $GdAlO_3$, a mixture comprised of from a trace amount to less than about 13.1% by volume of $Gd_2O_3$ and from a trace amount to less than about 13.7% by volume of $Gd_4Al_2O_9$, and a mixture comprised of from a trace amount to less than about 13.7% by volume of $Gd_4Al_2O_9$ and from a trace amount to less than about 6.4% by volume of $GdAlO_3$.

By a trace or trace amount of a phase in the present sintered body, it is meant an amount detectable by X-ray diffraction analysis.

In another embodiment, the polycrystalline aluminum nitride body produced by the present process has a composition defined and encompassed by polygon ABCQRS excluding line CQ of FIG. 2, i.e. it is comprised of from about 8.0 equivalent % to greater than about 0.55 equivalent % gadolinium, from about 92.0 equivalent % to less than about 99.45 equivalent % aluminum, from about 1.3 equivalent % to about 9.0 equivalent % oxygen and from about 98.7 equivalent % to about 91.0 equivalent % nitrogen.

Also, the polycrystalline body defined and encompassed by polygon ABCQRS excluding line CQ of FIG. 2 is comprised of an AlN phase and a Gd phase selected from the group consisting essentially of from about 4.1% by volume to about 13.1% by volume of $Gd_2O_3$, from about 1.5% by volume to about 13.7% by volume of $Gd_4Al_2O_9$, a mixture comprised of from a trace to less than about 13.1% by volume of $Gd_2O_3$ and from a trace to less than about 13.7% by volume $Gd_4Al_2O_9$, and a mixture comprised of from a trace to less than about 13.7% by volume of $Gd_4Al_2O_9$ and from a trace to less than about 6.4% by volume of $GdAlO_3$.

In one embodiment, the present polycrystalline body has a composition defined and encompassed by polygon IJKQRS excluding line KQ of FIG. 2, i.e., it has a composition comprised of from about 5.75 equivalent % to greater than about 0.55 equivalent % gadolinium, from about 94.25 equivalent % to less than about 99.45 equivalent % aluminum, from about 6.7 equivalent % to about 1.3 equivalent % oxygen and from about 93.3 equivalent % to about 98.7 equivalent % nitrogen.

Also, the polycrystalline body defined and encompassed passed by polygon IJKQRS excluding line KQ of FIG. 2 has a phase composition comprised of AlN and a Gd phase selected from the group consisting essentially of from about 4.1% by volume to about 9.6% by volume of $Gd_2O_3$, from about 1.5% by volume to about 10.1% by volume of $Gd_4Al_2O_9$, a mixture comprised of from a trace amount to less than about 9.6% by volume of $Gd_2O_3$ and from a trace amount to less than about 10.1% by volume of $Gd_4Al_2O_9$, and a mixture comprised of from a trace amount to less than about 10.1% by volume of $Gd_4Al_2O_9$ and from a trace to less than about 4.3% by volume of $GdAlO_3$.

In another embodiment, the polycrystalline aluminum nitride body produced by the present process has a composition defined and encompassed by polygon MNOQRS excluding line OQ of FIG. 2, i.e. it is comprised of from about 3.75 equivalent % to greater than about 0.55 equivalent % gadolinium, from about 96.25 equivalent % to less than about 99.45 equivalent % aluminum, from about 4.0 equivalent % to about 1.3 equivalent % oxygen and from about 96.0 equivalent % nitrogen to about 98.7 equivalent % nitrogen.

Also, the polycrystalline body defined and encompassed by polygon MNOQRS excluding line OQ of FIG. 2 is comprised of an AlN phase and a Gd phase selected from the group consisting essentially of from about 4.1% by volume to about 6.3% by volume of $Gd_2O_3$, from about 1.5% by volume to about 5.9% by volume of $Gd_4Al_2O_9$, a mixture of from a trace to less than about 6.3% by volume of $Gd_2O_3$ and from a trace to less than about 5.9% by volume of $Gd_4Al_2O_9$, and a mixture comprised of from a trace to less than about 5.9% by volume of $Gd_4Al_2O_9$ and from a trace to less than about 2.1% by volume of $GdAlO_3$.

In another embodiment, the polycrystalline aluminum nitride body produced by the present process has a composition defined and encompassed by polygon SRQFGH excluding line QF of FIG. 2, i.e. it is comprised of from about 2.4 equivalent % to greater than about 0.3 equivalent % gadolinium, from about 97.6 equivalent % to less than about 99.7 equivalent % aluminum, from about 2.4 equivalent % to about 0.9 equivalent % oxygen and from abot 99.1 equivalent % to about 97.6 equivalent % nitrogen.

Also, the polycrystalline body defined and encompassed by polygon SRQFGH excluding line QF of FIG. 2 is comprised of an AlN phase and a Gd phase selected from the group consisting essentially of from about 3.2% by volume to about 4.1% by volume of $Gd_2O_3$, from about 0.9% by volume to about 1.5% by volume of $Gd_4Al_2O_9$, a mixture comprised of from a trace to less than about 4.1% by volume of $Gd_2O_3$ and from a trace to less than about 1.5% by volume of $Gd_4Al_2O_9$, and a mixture comprised of from a trace to less than about 1.5% by volume of $Gd_4Al_2O_9$ and from a trace to less than about 1.4% by volume of $GdAlO_3$.

In another embodiment, the present process produces a sintered body defined by line KO of FIG. 2, i.e. it is comprised of from about 1.8 equivalent % to about 0.8 equivalent % gadolinium, from about 98.2 equivalent % to about 99.2 equivalent % aluminum, from about 4.3 equivalent % to about 2.4 equivalent % oxygen and from about 95.7 equivalent % to about 97.6 equivalent % nitrogen.

Line KO has a phase composition comprised of AlN and from about 2.1% by volume to about 4.3% by volume of $GdAlO_3$.

In another embodiment, the present process produces a sintered body defined by line OF of FIG. 2, i.e. it is comprised of from about 0.8 equivalent % to about 0.3 equivalent % gadolinium, from about 99.2 equivalent % to about 99.7 equivalent % aluminum, from about 2.4 equivalent % to about 1.4 equivalent % oxygen and from about 97.6 equivalent % to about 98.6 equivalent % nitrogen.

Line OF has a phase composition comprised of AlN and from about 0.7% by volume to about 2.1% by volume of $GdAlO_3$.

In the present process, the aluminum nitride powder can be of commercial or technical grade. Specifically, it should not contain any impurities which would have a signicantly deleterious effect on the desired properties of the resulting sintered product. The starting aluminum nitride powder used in the present process contains oxygen generally ranging in amount up to about 4.4% by weight and usually ranging from greater than about 0.5% by weight to less than about 4.0% by weight, i.e. up to about 4% by weight, and more preferably ranging from greater than about 1.00% by weight to less than about 4.00% by weight. Typically, commercially available aluminum nitride powder contains from about 1.5 weight % (2.6 equivalent %) to about 3 weight % (5.2 equivalent %) of oxygen and such powders are most preferred on the basis of their substantially lower cost.

Generally, the present starting aluminum nitride powder has a specific surface area which can range widely, and generally it ranges up to about 10 $m^2/g$. Frequently, it has a specific surface area greater than about 1.0 $m^2/g$, and more frequently of at least about 3.0 $m^2/g$, usually greater than about 3.2 $m^2/g$, and preferably at least about 3.4 $m^2/g$.

Generally, the present aluminum nitride powder in the present mixture, i.e. after the components have been mixed, usually by milling, has a specific surface area which can range widely, and generally it ranges to about 10 $m^2/g$. Frequently, it ranges from greater than about 1.0 $m^2/g$ to about 10 $m^2/g$, and more frequently from about 3.0 $m^2/g$ to about 10 $m^2/g$, and preferably it ranges from about 1.5 $m^2/g$ to about 5 $m^2/g$, and more preferably it ranges from about 3.0 $m^2/g$ to about 5 $m^2/g$, according to BET surface area measurement. Specifically, the minimum sintering temperature of a given composition of the present invention increases with increasing particle size of the aluminum nitride.

Generally, the gadolinium oxide ($Gd_2O_3$) additive in the present mixture has a specific surface area which can range widely. Generally, it is greater than about 0.2 $m^2/g$ and generally it ranges from greater than about 0.2 $m^2/g$ to about 7.0 $m^2/g$, usually from about 0.4 $m^2/g$ to about 5.0 $m^2/g$, and more usually from about 2 $m^2/g$ to about 5.0 $m^2/g$.

In the practice of this invention, carbon for deoxidation of aluminum nitride powder is provided in the form of free carbon which can be added to the mixture as elemental carbon, or in the form of a carbonaceous additive, for example, an organic compound which can thermally decompose to provide free carbon.

The present carbonaceous additive is selected from the group consisting of free carbon, a carbonaceous organic material and mixtures thereof. The carbonaceous organic material pyrolyzes, i.e. thermally decomposes, completely at a temperature ranging from about 50° C. to about 1000° C. to free carbon and gaseous product of decomposition which vaporizes away. In a preferred embodiment, the carbonaceous additive is free carbon, and preferably, it is graphite.

High molecular weight aromatic compounds or materials are the preferred carbonaceous organic materials for making the present free carbon addition since they ordinarily give on pyrolysis the required yield of particulate free carbon of submicron size. Examples of such aromatic materials are a phenolformaldehyde condensate resin known as Novolak which is soluble in acetone or higher alcohols, such as butyl alcohol, as well as many of the related condensation polymers or resins such as those of resorcinol-formaldehyde, aniline-formaldehyde, and cresol formaldehyde. Another satisfactory group of materials are derivatives of polynuclear aromatic hydrocarbons contained in coal tar, such as dibenzanthracene and chrysene. A preferred group are polymers of aromatic hydrocarbons such as polyphenylene or polymethylphenylene which are soluble in aromatic hydrocarbons.

The present free carbon has a specific surface area which can range widely and need only be at least sufficient to carry out the present deoxidation. Generally, it has a specific surface area greater than about 10 $m^2/g$, preferably greater than 20 $m^2/g$, more preferably greater than about 100 $m^2/g$, and still more preferably greater than 150 $m^2/g$, according to BET surface area measurement to insure intimate contact with the AlN powder for carrying out its deoxidation.

Most preferably, the present free carbon has as high a surface area as possible. Also, the finer the particle size of the free carbon, i.e. the higher its surface area, the smaller are the holes or pores it leaves behind in the deoxidized compact. Generally, the smaller the pores of a given deoxidized compact, the lower is the amount of liquid phase which need be generated at sintering temperature to produce a sintered body having a porosity of less than about 1% by volume of the body.

By processing of the aluminum nitride powder into a compact for deoxidation by free carbon, it is meant herein to include all mixing of the aluminum nitride powder to produce the present mixture, all shaping of the resulting mixture to produce the compact, as well as handling and storing of the compact before it is deoxidized by carbon. In the present process, processing of the aluminum nitride powder into a compact for deoxidation by free carbon is at least partly carried out in air, and during such processing of the aluminum nitride powder, it picks up oxygen from air usually in an amount greater than about 0.03% by weight of the aluminum nitride, and any such pick up of oxygen is controllable and reproducible or does not differ significantly if carried out under the same conditions. If desired, the processing of the aluminum nitride powder into a compact for deoxidation by free carbon can be carried out in air.

In the present processing of aluminum nitride, the oxygen it picks up can be in any form, i.e. it initially may be oxygen, or initially it may be in some other form, such as, for example, water. The total amount of oxygen picked up by aluminum nitride from air or other media is less than about 3.00% by weight, and generally ranges from greater than about 0.03% by weight to less than about 3.00% by weight, and usually it ranges from about 0.10% by weight to about 1.00% by weight, and preferably it ranges from about 0.15% by weight to about 0.70% by weight, of the total weight of the aluminum nitride. Generally, the aluminum nitride in the present mixture and compact prior to deoxidation of the compact has an oxygen content of less than about 4.70% by weight, and generally it ranges from greater than about 0.6% by weight, preferably greater than about 1.40% by weight, to less than about 4.70% by weight, and usually it ranges from about 2.00% by weight to about 4.00% by weight, and more usually it ranges from about 2.20% by weight to about 3.50% by weight, of the total weight of aluminum nitride.

The oxygen content of the starting aluminum nitride powder and that of the aluminum nitride in the compact prior to deoxidation is determinable by neutron activation analysis.

In a compact, an aluminum nitride containing oxygen in an amount of about 4.7% by weight or more generally is not desirable.

In carrying out the present process, a uniform or at least a significantly uniform mixture or dispersion of the aluminum nitride powder, gadolinium oxide powder and carbonaceous additive, generally in the form of free carbon powder, is formed and such mixture can be formed by a number of techniques. Preferably, the powders are ball milled preferably in a liquid medium at ambient pressure and temperature to produce a uniform or significantly uniform dispersion. The milling media, which usually are in the form of cylinders or balls, should have no significant deleterious effect on the powders, and preferably, they are comprised of steel or polycrystalline aluminum nitride, preferably made by sintering a compact of milling media size of AlN powder and $Gd_2O_3$ sintering additive. Generally, the milling media has a diameter of at least about ¼ inch and usually ranges from about ¼ inch to about ½ inch in diameter. The liquid medium should have no significantly deleterious effect on the powders and preferably it is non-aqueous. Preferably, the liquid mixing or milling medium can be evaporated away completely at a temperature ranging from about room or ambient temperature to below 300° C. leaving the present mixture. Preferably, the liquid mixing medium is an organic liquid such as heptane, hexane or trichloroethane. Also, preferably, the liquid milling medium contains a dispersant for the aluminum nitride powder thereby producing a uniform or significantly uniform mixture in a significantly shorter period of milling time. Such dispersant should be used in a dispersing amount and it should evaporate or decompose and evaporate away completely or leave no significant residue, i.e. no residue which has a significant effect in the present process, at an elevated temperature below 1000° C. Generally, the amount of such dispersant ranges from about 0.1% by weight to less than about 3% by weight of the aluminum nitride powder, and generally it is an organic liquid, preferably oleic acid.

In using steel milling media, a residue of steel or iron is left in the dried dispersion or mixture which can range from a detectable amount up to about 3.0% by weight of the mixture. This residue of steel or iron in the mixture has no significant effect in the present process or on the thermal conductivity of the resulting sintered body.

The liquid dispersion can be dried by a number of conventional techniques to remove or evaporate away the liquid and produce the present particulate mixture. If desired, drying can be carried out in air. Drying of a milled liquid dispersion in air causes the aluminum nitride to pick up oxygen and, when carried out under the same conditions, such oxygen pick up is reproducible or does not differ significantly. Also, if desired, the dispersion can be spray dried.

A solid carbonaceous organic material is preferably admixed in the form of a solution to coat the aluminum nitride particles. The solvent preferably is non-aqueous. The wet mixture can then be treated to remove the solvent producing the present mixture. The solvent can be removed by a number of techniques such as by evaporation or by freeze drying, i.e. subliming off the solvent in vacuum from the frozen dispersion. In this way, a substantially uniform coating of the organic material on the aluminum nitride powder is obtained which on pyrolysis produces a substantially uniform distribution of free carbon.

The present mixture is shaped into a compact in air, or includes exposing the aluminum nitride in the mixture to air. Shaping of the present mixture into a compact can be carried out by a number of techniques such as extrusion, injection molding, die pressing, isostatic pressing, slip casting, roll compaction or forming, or tape casting to produce the compact of desired shape. Any lubricants, binders or similar shaping aid materials used to aid shaping of the mixture should have no significant deteriorating effect on the compact or the present resulting sintered body. Such shaping-aid materials are preferably of the type which evaporate away on heating at relatively low temperatures, preferably below 400° C., leaving no significant residue. Preferably, after removal of the shaping aid materials, the compact has a porosity of less than 60% and more preferably less than 50% to promote densification during sintering.

If the compact contains carbonaceous organic material as a source of free carbon, it is heated at a temperature ranging from about 50° C. to about 1000° C. to pyrolyze, i.e. thermally decompose, the organic material completely producing the present free carbon and gaseous product of decomposition which vaporizes away. Thermal decomposition of the carbonaceous organic material is carried out, preferably in a vacuum or at ambient pressure, in a nonoxidizing atmosphere. Preferably, the nonoxidizing atmosphere in which thermal decomposition is carried out is selected from the group consisting of nitrogen, hydrogen, a noble gas such as argon and mixtures thereof, and more preferably it is nitrogen, or a mixture of at least about 25% by volume nitrogen and a gas selected from the group consisting of hydrogen, a noble gas such as argon and mixtures thereof. In one embodiment, it is a mixture of nitrogen and from about 1% by volume to about 5% by volume hydrogen.

The actual amount of free carbon introduced by pyrolysis of the carbonaceous organic material can be determined by pyrolyzing the organic material alone and determining weight loss. Preferably, thermal decomposition of the organic material in the present compact is done in the sintering furnace as the temperature is being raised to deoxidizing temperature, i.e. the temperature at which the resulting free carbon reacts with the oxygen content of the AlN.

Alternately, in the present process, gadolinium oxide can be provided by means of a precursor therefor. The precursor can be any organic or inorganic compound which decomposes completely at an elevated temperature below about 1200° C. to form the present gadolinium oxide and by-product gas which vaporizes away leaving no contaminants in the sintered body which would be detrimental to the thermal conductivity. Representative of the precursors of the present gadolinium oxide useful in the present process is the acetate, carbonate, oxalate, nitrate, sulfate and hydroxide of gadolinium.

If the compact contains a precursor for the gadolinium oxide, it is heated to a temperature up to about 1200° C. to thermally decompose the precursor thereby providing the gadolinium oxide. Such thermal decomposition is carried out in a nonoxidizing atmosphere, preferably in a vacuum or at ambient pressure, and preferably the atmosphere is selected from the group consisting of nitrogen, hydrogen, a noble gas such as argon and mixtures thereof. Preferably, it is nitrogen, or a mixture of at least about 25% by volume nitrogen and a gas selected from the group consisting of hydrogen, a noble gas such as argon and mixtures thereof. In one embodiment, it is a mixture of nitrogen and from about 1% by volume to about 5% by volume hydrogen.

The present deoxidation of aluminum nitride with carbon, i.e. carbon-deoxidation, comprises heating the compact comprised of aluminum nitride, free carbon and gadolinium oxide at deoxidation temperature to react the free carbon with at least a sufficient amount of the oxygen contained in the aluminum nitride to produce the present deoxidized compact. This deoxidation with carbon is carried out at a temperature ranging from about 1350° C. to a temperature at which the pores of the compact remain open, i.e. a temperature which is sufficient to deoxidize the compact but below its pore closing temperature, generally up to about 1800° C., and preferably, it is carried out at from about 1600° C. to 1650° C.

The carbon-deoxidation is carried out, preferably at ambient pressure, in a gaseous nitrogen-containing non-oxidizing atmosphere which contains sufficient nitrogen to facilitate the deoxidation of the aluminum nitride. In accordance with the present invention, nitrogen is a required component for carrying out the deoxidation of the compact. Preferably, the nitrogen-containing atmosphere is nitrogen, or it is a mixture of at least about 25% by volume of nitrogen and a gas selected from the group consisting of hydrogen, a noble gas such as argon, and mixtures thereof. Also, preferably, the nitrogen-containing atmosphere is comprised of a mixture of nitrogen and hydrogen, especially a mixture containing up to about 5% by volume hydrogen.

The time required to carry out the present carbon-deoxidation of the compact is determinable empirically and depends largely on the thickness of the compact as well as the amount of free carbon it contains, i.e. the carbon-deoxidation time increases with increasing thickness of the compact and with increasing amounts of free carbon contained in the compact. Carbon-deoxidation can be carried out as the compact is being heated to sintering temperature provided that the heating rate allows the deoxidation to be completed while the pores of the compact are open and such heating rate is determinable empirically. Also, to some extent, carbon deoxidation time depends on deoxidation temperature, particle size and uniformity of the particulate mixture of the compact i.e. the higher the deoxidation temperature, the smaller the particle size and the more uniform the mixture, the shorter is deoxidation time. Also, to some extent, deoxidation time depends on its final position on the phase diagram, i.e. as line AH is approached, deoxidation time increases. Typically, the carbon-deoxidation time ranges from about ¼ hour to about 1.5 hours.

Preferably, the compact is deoxidized in the sintering furnace by holding the compact at deoxidation temperature for the required time and then raising the temperature to sintering temperature. The deoxidation of the compact must be completed before sintering closes off pores in the compact preventing gaseous product from vaporizing away and thereby preventing production of the present sintered body.

In the present deoxidation with carbon, the free carbon reacts with the oxygen of the aluminum nitride producing carbon monoxide gas which vaporizes away. It is believed that the following deoxidation reaction occurs wherein the oxygen content of the aluminum nitride is given as $Al_2O_3$:

$$Al_2O_3 + 3C\ N_2 \rightarrow 3CO_{(g)} + 2AlN \quad (2)$$

In the deoxidation effected by carbon, gaseous carbon-containing product is produced which vaporizes away thereby removing free carbon.

If the compact before deoxidation is heated at too fast a rate through the carbon-deoxidation temperature to sintering temperature, and such too fast rate would depend largely on the composition of the compact and the amount of carbon it contains, the present carbon-deoxidation does not occur, i.e. an insufficient amount of deoxidation occurs, and a significant amount of carbon is lost by reactions (3) and/or (3A).

$$C + AlN \rightarrow AlCN_{(g)} \quad (3)$$

$$C + \tfrac{1}{2}N_2 \rightarrow CN_{(g)} \quad (3A)$$

The specific amount of free carbon required to produce the present deoxidized compact can be determined by a number of techniques. It can be determined empirically. Preferably, an initial approximate amount of carbon is calculated from Equation (2), that is the stoichiometric amount for carbon set forth in Equation (2), and using such approximate amount, the amount of carbon required in the present process to produce the present sintered body would require one or a few runs to determine if too much or too little carbon had been added. Specifically, this can be done by determining the porosity of the sintered body and by analyzing it for carbon and by X-ray diffraction analysis. If the compact contains too much carbon, the resulting deoxidized compact will be difficult to sinter and will not produce the present sintered body having a porosity of less than about 10% by volume, or the sintered body will contain carbon in an excessive amount. If the compact contains too little carbon, X-ray diffraction analysis of the resulting sintered body will show that it does not have the present composition.

The amount of free carbon used to carry out the present deoxidation should produce the present deoxidized compact leaving no significant amount of carbon in any form, i.e. no amount of carbon in any form which would have a significantly deleterious effect on the sintered body. More specifically, no amount of carbon in any form should be left in the deoxidized compact which would prevent production of the present sintered body, i.e. any carbon content in the sintered body should be low enough so that the sintered body has a thermal conductivity greater than 0.70 W/cm·K at 25° C. Generally, the present sintered body may contain carbon in some form in a trace amount, i.e. generally less than about 0.08% by weight, preferably in an amount of less than about 0.065% by weight, and more preferably less than about 0.04% by weight, and most preferably less than 0.03% by weight of the total weight of the sintered body.

A significant amount of carbon in any form remaining in the sintered body significantly reduces its thermal conductivity. An amount of carbon in any form greater than about 0.065% by weight of the sintered body is likely to significantly decrease its thermal conductivity.

The present deoxidized compact is densified, i.e. liquid-phase sintered, at a temperature which is a sintering temperature for the composition of the deoxidized compact to produce the present sintered body. For the present deoxidized compact, this sintering temperature generally is at least about 1840° C. and generally ranges from about 1840° C. to about 2050° C. with the minimum sintering temperature increasing generally from about 1840° C. for a composition at point C to generally about 1960° C. for a composition at point A to about 1980° C. at point H of FIG. 2. Minimum sintering temperature is dependent most strongly on composition and less strongly on particle size.

Specifically, the minimum sintering temperature is dependent largely on the composition (i.e., position in the FIG. 2 phase diagram), the green density of the compact, i.e. the porosity of the compact after removal of shaping aid materials but before deoxidation, the particle size of aluminum nitride, and to a much lesser extent the particle size of gadolinium oxide and carbon. The minimum sintering temperature increases as the composition moves away from line BC toward line AH and also toward line HGF. In addition, it increases as the green density of the compact decreases, and as the particle size of aluminum nitride, and to a much lesser extent, gadolinium oxide and carbon increases.

To carry out the present liquid phase sintering, the present deoxidized compact contains sufficient equivalent percent of Gd and O to form a sufficient amount of liquid phase at sintering temperature to densify the carbon deoxidized compact to produce the present sintered body. The present minimum densification, i.e. sintering, temperature depends on the composition of the deoxidized compact, i.e. the amount of liquid phase it generates. Specifically, for a sintering temperature to be operable in the present invention, it must generate at least sufficient liquid phase in the particular composition of the deoxidized compact to carry out the present liquid phase sintering to produce the present product. For a given composition, the lower the sintering temperature, the smaller is the amount of liquid phase generated, i.e. densification becomes more difficult with decreasing sintering temperature. However, a sintering temperature higher than about generally 2050° C. provides no significant advantage.

The deoxidized compact is sintered, preferably at or about ambient pressure, in a gaseous nitrogen-containing nonoxidizing atmosphere which contains at least sufficient nitrogen to prevent significant weight loss of aluminum nitride. In accordance with the present invention, nitrogen is a necessary component of the sintering atmosphere to prevent any significant weight loss of AlN during sintering, and also to optimize the deoxidation treatment and to remove carbon. Significant weight loss of the aluminum nitride can vary depending on its surface area to volume ratio, i.e. depending on the form of the body, for example, whether it is in the form of a thin or thick tape. As a result, generally, significant weight loss of aluminum nitride ranges from in excess of about 5% by weight to in excess of about 10% by weight of the aluminum nitride. Preferably, the nitrogen-containing atmosphere is nitrogen, or it is a mixture at least about 25% by volume nitrogen and a gas selected from the group consisting of hydrogen, a noble gas such as argon and mixtures thereof. Also, preferably, the nitrogen-containing atmosphere is comprised of a mixture of nitrogen and hydrogen, especially a mixture containing from about 1% by volume to about 5% by volume hydrogen.

Sintering time is determinable empirically. Typically, sintering time ranges from about 40 minutes to about 90 minutes.

The present sintered polycrystalline body is a pressureless sintered ceramic body. By pressureless sintering herein it is meant the densification or consolidation of the deoxidized compact without the application of mechanical pressure into a ceramic body having a porosity of less than about 10% by volume, and preferably less than about 4% by volume.

The polycrystalline body of the present invention is liquid-phase sintered. I.e., it sinters due to the presence of a liquid phase, that is liquid at the sintering temperature and is rich in Gd and oxygen and contains some aluminum and nitrogen. In the present polycrystalline body, the AlN grains have about the same dimensions in all directions, and are not elongated or disk shaped. Generally, the AlN in the present polycrystalline body has an average grain size ranging from about 1 micron to about 20 microns. An intergranular second phase of $Gd_2O_3$ or $Gd_4Al_2O_9$ or $GdAlO_3$ or a mixture of some of the following phases: $Gd_2O_3$, $Gd_4Al_2O_9$, $GdAlO_3$, is present along some of the AlN grain boundaries. The morphology of the microstructure of the present sintered body indicates that this intergranular second phase or phases was a liquid at the sintering temperature. As the composition approaches line AB in FIG. 2, the amount of liquid phase increases and the AlN grains in the present sintered body become more rounded and have a smoother surface. As the composition moves away from line AB in FIG. 2 and approaches line FG, the amount of liquid phase decreases and the AlN grains in the present sintered body become less rounded and the corners of the grains become sharper.

The present sintered body has a porosity of less than about 10% by volume, and generally less than about 4% by volume, of the sintered body. Preferably, the present sintered body has a porosity of less than about 2% and most preferably less than about 1% by volume of the sintered body. Any pores in the sintered body are fine sized, and generally they are less than about 1 micron in diameter. Porosity can be determined by standard metallographic procedures and by standard density measurements.

The present process is a control process for producing a sintered body of aluminum nitride having a thermal conductivity greater than 0.70 W/cm·K at 25° C. Generally, the thermal conductivity of the present polycrystalline body is less than that of a high purity single crystal of aluminum nitride which is about 2.8 W/cm·K at 25° C. If the same procedure and conditions are used throughout the present process, the resulting sintered body has a thermal conductivity and composition which is reproducible or does not differ significantly. Generally, in a given two-phase region or three-phase region thermal conductivity increases with a decrease in volume % of second phase, and for a given composition with increase in sintering temperature.

In the present process, aluminum nitride picks up oxygen in a controllable or substantially controllable manner. Specifically, if the same procedure and conditions are used in the present process, the amount of oxygen picked up by aluminum nitride is reproducible or does not differ significantly. Also, gadolinium oxide does not pick up oxygen, or does not pick up any significant amount of oxygen, from air or other media in the present process. More specifically, in the present process, gadolinium oxide or the present precursor therefor do not pick up any amount of oxygen in any form from the air or other media which would have any significant effect on the controllability or reproducibility of the present process. Any oxygen which gadolinium oxide might pick up in the present process is so small as to have no effect or no significant effect on the thermal conductivity or composition of the resulting sintered body.

Examples of calculations for equivalent % are as follows:

For a starting aluminum nitride powder weighing 89.0 grams measured as having 2.3 weight % oxygen, it is assumed that all of the oxygen is bound to AlN as $Al_2O_3$, and that the measured 2.3 weight % of oxygen is present as 4.89 weight % $Al_2O_3$ so that the AlN powder is assumed to be comprised of 84.65 grams AlN and 4.35 grams $Al_2O_3$.

A mixture is formed comprised of 89.0 grams of the starting AlN powder, 7.58 grams of $Gd_2O_3$ and 1.4 grams free carbon.

During processing, this AlN powder picks up additional oxygen by reactions similar to (4) and now contains 2.6 weight % oxygen.

$$2 AlN + 3H_2O \rightarrow Al_2O_3 + 2NH_3 \tag{4}$$

The resulting compact now is comprised of the following composition:
89.11 grams AlN powder containing 2.6 weight % oxygen, (84.19 g AlN + 4.92 g $Al_2O_3$), 7.58 grams $Gd_2O_3$ and 1.4 grams carbon.

During deoxidation of the compact, all the carbon is assumed to react with $Al_2O_3$ via reaction (5)

$$Al_2O_3 + 3C + N_2 \rightarrow 2AlN + 3CO_{(g)} \tag{5}$$

In the present invention, the carbon will not reduce $Gd_2O_3$, but instead, reduces $Al_2O_3$.

After reaction (5) has gone to completion, the deoxidized compact now is comprised of the following composition which was calculated on the basis of Reaction (5):
88.34 grams AlN powder containing 0.5 weight % oxygen (87.38 grams AlN + 0.96 grams $Al_2O_3$) and 7.58 grams $Gd_2O_3$.

From this weight composition, the composition in equivalent % can be calculated as follows:

| | Wt(g) | Moles | Equivalents |
|---|---|---|---|
| AlN | 87.38 | 2.132 | 6.395 |
| $Al_2O_3$ | 0.958 | $9.40 \times 10^{-3}$ | $5.640 \times 10^{-2}$ |
| $Gd_2O_3$ | 7.58 | $2.090 \times 10^{-2}$ | 0.125 |

TOTAL EQUIVALENTS = 6.577
V = Valence
$M = Moles = \frac{Wt(g)}{MW}$
MW = molecular weight
Eq = Equivalents
Eq = M × V
Valences: Al + 3
Gd + 3
N − 3
O − 2

Eq % Gd in deoxidized compact = (6)

$$\frac{\text{no. Gd equivalents}}{\text{no. Gd equivalents + no. Al equivalents}} \times 100\% =$$

$$\frac{0.125}{6.577} \times 100\% = 1.91\%$$

Eq % O in deoxidized compact = (7)

$$\frac{\text{no. O equivalents}}{\text{no. O equivalents + no. N equivalents}} \times 100\%$$

$$= \frac{5.64 + 0.125}{6.577} \times 100\% = 2.76\% \tag{8}$$

This deoxidized compact as well as the sintered body contains about 1.91 equivalent % Gd and about 2.76 equivalent % Oxygen.

To produce the present sintered body containing 2.0 equivalent % Gd and 2.8 equivalent % O, i.e. comprised of 2 equivalent % Gd, 98 equivalent % Al, 2.8 equivalent % O and 97.2 equivalent % N, using an AlN powder measured as having 2.3 weight % Oxygen (4.89 weight % $Al_2O_3$), the following calculations for weight % from equivalent % can be made:
100 grams = weight of AlN powder
x grams = weight of $Gd_2O_3$ powder
z grams = weight of Carbon powder Assume that during processing, the AlN powder picks up additional oxygen by reaction similar to (9) and in the compact before deoxidation now contains 2.6 weight % oxygen (5.52 weight % $Al_2O_3$) and weighs 100.12 grams $$2AlN + 3H_2O \rightarrow Al_2O_3 + 2NH_3 \tag{9}$$

After processing, the compact can be considered as having the following composition:

| | Weight (g) | Moles | Equivalents |
|---|---|---|---|
| AlN | 94.59 | 2.308 | 6.923 |
| $Al_2O_3$ | 5.53 | 0.0542 | 0.325 |
| $Gd_2O_3$ | x | $2.759 \times 10^{-3}x$ | 0.01655x |
| C | z | .0833z | |

During deoxidation, 3 moles of carbon reduce 1 mole of $Al_2O_3$ and in the presence of $N_2$ form 2 moles of AlN by the reaction:

$$Al_2O_3 + 3C + N_2 \rightarrow 2AlN + 3CO \tag{10}$$

After deoxidation, all the carbon will have reacted and the compact can be considered as having the following composition:

| | Weight (g) | Moles | Equivalents |
|---|---|---|---|
| AlN | 94.59 + 2.275z | 2.308 + 0.05551z | 6.923 + 0.1665z |
| $Al_2O_3$ | 5.53 − 2.830z | 0.0542 − 0.02775z | 0.325 − 0.1665z |
| $Gd_2O_3$ | x | $2.759 \times 10^{-3} x$ | 0.01655 x |

$$T = \text{Total Equivalents} = 7.248 + 0.01655\,x \tag{11}$$

$$\text{Equivalent Fraction of } Gd = 0.02 = \frac{0.01655\,x}{T}$$

Equivalent Fraction of O = 0.028 = (12)

$$\frac{0.325 - 0.1665\,z + 0.01655\,x}{T}$$

Solving Equations (11) and (12) for x and z:
x = 8.94 grams of $Gd_2O_3$ powder
z = 1.60 grams of free carbon A body in a form or shape useful as a substrate, i.e. in the form of a flat thin piece of uniform thickness, or having no significant difference in its thickness, usually referred to as a substrate or tape, may become non-flat, for example, warp, during sintering and the resulting sintered body may require a heat treatment after sintering to flatten it out and make it useful as a substrate. This non-flatness or warping is likely to occur in the sintering of a body in the form of a substrate or tape having a thickness of less than about % 0.070 inch and can be eliminated by a flattening treatment, i.e. by heating the sintered body, i.e. substrate or tape, under a sufficient applied pressure at a temperature in the present sintering temperature range of from about 1840° C. to about 2050° C. for a period of time determinable empirically, and allowing the sandwiched body to cool to below its sintering temperature, preferably to ambient or room temperature, before recovering the resulting flat substrate or tape.

Specifically, in one embodiment of this flattening process, the non-flat substrate or tape is sandwiched between two plates and may be separated from such plates by a thin layer of AlN powder depending largely on its composition and the applied pressure. The sandwiched body is heated to its sintering temperature, i.e. a temperature which is a sintering temperature for the sandwiched sintered body, preferably in the same atmosphere used for sintering, under an applied pressure at least sufficient to flatten the body, generally at least about 0.03 psi, for a time period sufficient to flatten the sandwiched body, and then the sandwiched body is allowed to cool to below its sintering temperature before it is recovered.

One embodiment for carrying out this flattening treatment of a sintered thin body or substrate tape comprises sandwiching the sintered non-flat substrate or tape between two plates of a material which has no significant deleterious effect thereon such as molybdenum or tungsten, or an alloy containing at least about 80% by weight of tungsten or molybdenum. The sandwiched substrate or tape is separated from the plates by a thin layer, preferably a discontinuous coating, preferably a discontinuous monolayer, of aluminum nitride powder preferably just sufficient to prevent the body from sticking to the surfaces of the plates during the flattening heat treatment. The flattening pressure is determinable empirically and depends largely on the particular sintered body, the particular flattening temperature and flattening time period. The flattening treatment should have no significant deleterious effect on the sintered body. A decrease in flattening temperature requires an increase in flattening pressure or flattening time. Generally, at a temperature ranging from about 1840° C. to about 2050° C., the applied flattening pressure ranges from about 0.03 psi to about 1.0 psi, preferably from about 0.06 psi to about 0.50 psi. Typically, for example, heating the sandwiched sintered body at the sintering temperature under a pressure of from about 0.03 psi to about 0.5 psi for 1 hour in nitrogen produces a flat body useful as a substrate, especially as a upporting substrate for a semiconductor such as a silicon chip.

The present invention makes it possible to fabricate simple, complex and/or hollow shaped polycrystalline aluminum nitride ceramic articles directly. Specifically, the present sintered body can be produced in the form of a useful shaped article without machining or without any significant machining, such as a hollow shaped article for use as a container, a crucible, a thin walled tube, a long rod, a spherical body, a tape, substrate or carrier. It is useful as a sheath for temperature sensors. It is especially useful as a substrate for a semiconductor such as a silicon chip. The dimensions of the present sintered body differ from those of the unsintered body, by the extent of shrinkage, i.e. densification, which occurs during sintering.

The present ceramic body has a number of uses. In the form of a thin flat piece of uniform thickness, or having no significant difference in its thickness, i.e. in the form of a substrate or tape, it is especially useful as packaging for integrated circuits and as a substrate for an integrated circuit, particularly as a substrate for a semiconducting Si chip for use in computers.

The invention is further illustrated by the following examples wherein the procedure was as follows, unless otherwise stated:

The starting aluminum nitride powder was greater than 99% pure AlN exclusive of oxygen.

The starting aluminum nitride powder had a surface area of 3.4 $m^2/g$ (0.54 micron) and based on a series of deoxidations carried out with carbon powder, it was determined to have contained about 2.4 wt % oxygen.

The $Gd_2O_3$ powder, before any mixing, i.e., as received, had a surface area of about 3.9 $m^2/g$.

The carbon was graphite and it had a specific surface area of 200 $m^2/g$ (0.017 micron) as listed by the vendor.

In all of the examples, the milling media was hot-pressed aluminum nitride in the approximate form of cubes or rectangles having a density of about 100%.

In all of the examples, the dried milled powder mixture was die pressed at the given pressure in air at room temperature to produce a compact having a density greater than 50% of its theoretical density.

The compacts were in the form of square rods.

In all of the examples, the given powder mixture as well as the compact formed therefrom had a composition wherein the equivalent % of gadolinium and aluminum ranged between points A and F of FIG. 2.

The equivalent % composition of Gd, Al, O and N of the compacts of all of the examples, i.e., before deoxidation, was outside the composition defined and encompassed by polygon ABCFGH of FIG. 2.

In all of the examples, the aluminum nitride in the compact before deoxidation contained oxygen in an amount of less than about 4.70% by weight of the aluminum nitride.

The composition of the deoxidized compacts of all of the examples was defined and encompassed by polygon ABCFGH of FIG. 2.

In each example, the same atmosphere was used to carry out the deoxidation of the compact as was used to carry out the sintering of the deoxidized compact. The atmosphere to carry out the deoxidization was fed into the furnace at a rate of 1 SCFH to promote removal of the gases produced by deoxidation, and the flow rate during sintering was less than about 0.1 SCFH.

The atmosphere during all of the heat treatment in the examples was at ambient pressure which was atmospheric or about atmospheric pressure.

The furnace was a molybdenum heat element furnace.

The compacts were heated in the furnace to about 800° C. at about 25° C./min and then to the given deoxidation temperature at the rate of about 100° C. per minute and then to the given sintering temperature at the rate of about 50° C. per minute.

Based on other experiments, it was estimated that the aluminum nitride in the compact before deoxidation had an oxygen content of about 0.15% by weight to about 0.70% by weight higher than that of the starting aluminum nitride powder.

In Table II, the equivalent % composition of the sintered body was calculated from the starting powder composition and from the X-ray diffraction phase analysis of the sintered body. The Gd, Al, N and oxygen are assumed to have their conventional valences of: $+3$, $+3$, $-3$, $-2$, respectively. In the sintered bodies, the equivalent percent amount of Gd and Al was assumed to be the same as that in the starting powder. The equivalent percent oxygen and nitrogen are approximate and were determined from the equivalent percent gadolinium and Al and the X-ray diffraction phase analyses of the sintered bodies.

Density of the sintered body was determined by the Archimedes method.

Porosity in % by volume of the sintered body was determined by knowing the theoretical density of the sintered body on the basis of its composition and comparing that to the density measured using the following equation:

$$\text{porosity} = \left(1 - \frac{\text{measured density}}{\text{theoretical density}}\right) 100\% \quad (13)$$

The phase composition of each sintered body was determined by X-ray diffraction analysis.

The thermal conductivity of the sintered body of Example 1 was measured at 25° C. by a steady state heat-flow method using a rodshaped sample ~0.4 cm×0.4 cm×2.2 cm sectioned from the sintered body. This method was originally devised by A. Berget in 1888 and is described in an article by G. A. Slack in the "Encyclopaedic Dictionary of Physics", Ed. by J. Thewlis, Pergamon, Oxford, 1961. In this technique the sample is placed inside a high-vacuum chamber, heat is supplied at one end by an electrical heater, and the temperatures are measured with fine-wire thermocouples. The sample is surrounded by a guard cylinder. The absolute accuracy is about ±3% and the repeatability is about ±1%. As a comparison, the thermal conductivity of an $Al_2O_3$ single crystal was measured with a similar apparatus to be 0.44 W/cm·K at about 22° C.

EXAMPLE 1

4.056 grams of $Gd_2O_3$ powder and 0.472 grams of graphite powder were added to 29.99 grams of aluminum nitride powder and the mixture, along with aluminum nitride milling media, was immersed in trichloroethane containing oleic acid in an amount of about 0.7% by weight of the aluminum nitride powder in a plastic jar and vibratory milled in the closed jar at room temperature for about 22 hours. The milling media was then removed and a binder solution was added to the milled dispersion and the mixture was then roll mixed for about 2 hours. The binder solution was comprised of 1.13 grams of an organic binder, i.e., polyvinyl butyral which was in the form of a white powder, 0.43 grams of a plasticizer, i.e., dioctylphthalate, and 0.17 grams of a lubricant, i.e., polyethylene propylene oxide, which were dissolved in trichloroethane. The resulting dispersion was dried in air for about 2-3 hours and during such drying, the aluminum nitride picked up oxygen from the air. During milling, the mixture picked up 0.93 grams of AlN due to wear of the AlN milling media.

A portion of the resulting dried mixture was die pressed producing a compact.

The compact was placed on a molybdenum plate and heated in an atmosphere comprised of nitrogen and 2% by volume hydrogen to 1600° C. where it was held for 1 hour, and then the temperature was raised to 1950° C. where it was held for 1 hour, and then the sample was furnace cooled to ambient temperature.

This example is shown as Example 1 in Table II. The sintered body produced in Example 1 had a phase composition comprised of AlN, $Gd_2O_3$ in an amount of about 0.6% by volume of the sintered body and $Gd_4Al_2O_9$ in an amount of about 6.2% by volume of the sintered body. Also, it had an equivalent % composition comprised of about 4.5% O, (100%–4.5%) or 95.5% N, 2.9% Gd and (100%–2.9%) or 97.1% Al.

Examples 2–4 were carried out in substantially the same manner as Example 1 except as indicated herein and except as shown in Table II.

TABLE II

| | | Power Mixture (wt %) | | | Pressing Pressure | Heat Treatment | | | | |
|---|---|---|---|---|---|---|---|---|---|---|
| | | | | | | Deoxidation Temp — Time | | Sintering Temp — Time | | |
| Ex | Sample | AlN | $Gd_2O_3$ | C | kPSI | (°C.) — (Hr) | + | (°C.) — (Hr) | — | Atmosphere |
| 1 | 215A | 87.23 | 11.44 | 1.33 | 15 | 1600 — 1 | + | 1950 — 1 | — | $N_2$ + 2% $H_2$ |
| 2 | 217A | 94.30 | 4.48 | 1.22 | 15 | 1600 — 1 | + | 1850 — 1 | — | $N_2$ + 2% $H_2$ |
| 3 | 217B | 94.30 | 4.48 | 1.22 | 18 | — | | 1870 — 0.9 | — | $N_2$ + 2% $H_2$ |
| 4 | 218A | 94.67 | 4.51 | 0.82 | 15 | 1610 — 0.3 | + | 1860 — 1 | — | $N_2$ + 2% $H_2$ |

| | | Properties of Sintered Body | | | | | |
|---|---|---|---|---|---|---|---|
| | | Equivalent % | | Density | Approximate Porosity | Volume % of Second Phases | | |
| Ex | Sample | Oxygen | Gd | (g/cc) | (vol. %) | $Gd_2O_3$ | $Gd_4Al_2O_9$ | $GdAlO_3$ |
| 1 | 215A | ~4.5 | 2.9 | 3.49 | <1 | 0.6 | 6.2 | — |
| 2 | 217A | ~2.9 | 1.1 | 3.27 | 3 | — | — | 2.6 |
| 3 | 217B | ~2.9 | 1.1 | 3.36 | <1 | — | — | 2.6 |
| 4 | 218A | ~2.9 | 1.1 | 3.38 | <1 | — | — | 2.6 |

Examples 1–4 illustrate the present invention. The sintered bodies produced in Examples 1–4 had a composition defined and encompassed by polygon ABCFGH of FIG. 2. The sintered bodies produced in Examples 1–4 were about 0.16 in. by 0.16 in. by 1.5 in. Based on other work, it was known that the sintered bodies produced in Examples 1–4 had a carbon content of less than about 0.065% by weight. The thermal conductivity of the sintered body produced in Example 1 was measured and found to be 1.52 W/cm·K at 25° C.

Based on other experiments and a comparison of Examples 1 and 2–4, it was known that the sintered bodies produced in Examples 2–4 had a thermal conductivity greater than 0.7 W/cm·K at 25° C.

The sintered bodies produced in Examples 1–4 would be useful for packaging of integrated circuits as well as for use as a substrate or carrier for a semiconductor such as a silicon chip.

What is claimed is:

1. A process for producing a sintered polycrystalline aluminum nitride ceramic body having a composition defined and encompassed by polygon ABCFGH of FIG. 2, a porosity of less than about 10% by volume of said body and a thermal conductivity greater than 0.70 W/cm·K at 25° C. which consists essentially of the steps:

(a) forming a mixture consisting essentially of an oxygen-containing aluminum nitride powder, gadolinium oxide and free carbon, shaping said mixture into a compact, said mixture and said compact having a composition wherein the equivalent % of said gadolinium and aluminum ranges from point A to point F of FIG. 2, said gadolinium ranging from about 8.0 equivalent % to about 0.3 equivalent %, said aluminum ranging from about 92.0 equivalent % to about 99.7 equivalent %, said mixture and said compact having an equivalent % composition of Gd, Al, O and N outside the composition defined and encompassed by polygon ABCFGH of FIG. 2, (b) heating said compact in a nitrogen-containing nonoxidizing atmosphere at a temperature ranging from about 1350° C. to a temperature sufficient to deoxidize the compact but below its pore closing temperature reacting said free carbon with oxygen contained in said aluminum nitride producing a deoxidized compact, said deoxidized compact having a composition wherein the equivalent % of Al, Gd, O and N is defined and encompassed by polygon ABCFGH of FIG. 2, said free carbon being in an amount which produces said deoxidized compact, and (c) sintering said deoxidized compact in a nitrogen-containing nonoxidizing atmosphere at a minimum temperature of about 1840° C. producing said polycrystalline body.

2. The process according to claim 1 wherein said nitrogen-containing atmosphere in step (b) contains sufficient nitrogen to facilitate deoxidation of the aluminum nitride to produce said sintered body.

3. The process according to claim 1 wherein said nitrogen-containing atmosphere in step (c) contains sufficient nitrogen to prevent significant weight loss of said aluminum nitride.

4. The process according to claim 1 wherein said process is carried out at ambient pressure.

5. The process according to claim 1 wherein said porosity is less than about 4% by volume of said body.

6. The process according to claim 1 wherein said mixture and said compact have a composition wherein the equivalent % of said gadolinium and aluminum ranges from point A up to point Q of FIG. 2, said gadolinium ranging from about 8.0 equivalent % to greater than about 0.55 equivalent % and said aluminum ranging from about 92.0 equivalent % to less than about 99.45 equivalent %, said mixture and said compact having an equivalent % composition of Gd, Al, O and N outside the composition defined and encompassed by polygon ABCQRS of FIG. 2, and said deoxidized compact and sintered body are comprised of a composition wherein the equivalent percent of Al, Gd, O and N is defined and encompassed by polygon ABCQRS excluding line CQ of FIG. 2.

7. The process according to claim 1 wherein said mixture and said compact have a composition wherein the equivalent % of said gadolinium and aluminum ranges from point I up to point Q of FIG. 2, said gadolinium ranging from about 5.75 equivalent % to greater than about 0.55 equivalent % and said aluminum ranging from about 94.25 equivalent % to less than about 99.45 equivalent %, said mixture and said compact having an equivalent % composition of Gd, Al, O and N outside the composition defined and encompassed by polygon IJKQRS of FIG. 2, and said deoxidized compact and sintered body are comprised of a composition wherein the equivalent % of Al, Gd, O and N is defined and encompassed by polygon IJKQRS but excluding line KQ of FIG. 2.

8. The process according to claim 1 wherein said mixture and said compact have a composition wherein the equivalent % of said gadolinium and aluminum ranges from point M up to point Q of FIG. 2, said gadolinium ranging from about 3.75 equivalent % to greater than about 0.55 equivalent % and said aluminum ranging from about 96.25 equivalent % to less than about 99.45 equivalent %, said mixture and said compact having an equivalent % composition of Gd, Al, O and N outside the composition defined and encompassed by polygon MNOQRS of FIG. 2, said deoxidized compact and sintered body are comprised of a composition wherein the equivalent % of Al, Gd, O and N is defined and encompassed by polygon MNOQRS excluding line OQ of FIG. 2, and wherein said minimum sintering temperature is about 1850° C.

9. The process according to claim 1 wherein said mixture and said compact have a composition wherein the equivalent % of said gadolinium and aluminum ranges from point S up to point F of FIG. 2, said gadolinium ranging from about 2.4 equivalent % to greater than about 0.3 equivalent % and said aluminum ranging from about 97.6 equivalent % to less than about 99.7 equivalent %, said mixture and said compact having an equivalent % composition of Gd, Al, O and N outside the composition defined and encompassed by polygon SRQFGH of FIG. 2, said deoxidized compact and sintered body are comprised of a composition wherein the equivalent percent of Al, Gd, O and N is defined and encompassed by polygon SRQFGH, excluding line QF of FIG. 2, and wherein said minimum sintering temperature ranges from about 1890° C. to about 1920° C.

10. The process according to claim 1 wherein said mixture and said compact hav a composition wherein the equivalent % of said gadolinium and aluminum ranges from point K to point O of FIG. 2, said gadolinium ranging from about 1.8 equivalent % to about 0.8 equivalent % and said aluminum ranging from about 98.2 equivalent % to about 99.2 equivalent %, said mixture and said compact having an equivalent % composition of Gd, Al, O and N outside the composition defined by line KO of FIG. 2, and said deoxidized compact and sintered body are comprised of a composition wherein the equivalent percent of Al, Gd, O and N is defined by line KO of FIG. 2.

11. The process according to claim 1 wherein said mixture and said compact have a composition wherein the equivalent % of said gadolinium and aluminum ranges from point O to point F of FIG. 2, said Gd ranging from about 0.8 equivalent % to about 0.3 equivalent % and said aluminum ranging from about 99.2 equivalent % to about 99.7 equivalent %, said mixture and said compact having an equivalent % composition of Gd, Al, O and N outside the composition defined by line OF, said deoxidized compact and said sintered body are comprised of a composition wherein the equivalent percent of Al, Gd, O and N is defined by line OF of FIG. 2, and wherein said minimum sintering temperature is about 1850° C.

12. A process for producing a sintered polycrystalline aluminum nitride ceramic body having composition defined and encompassed by polygon ABCFGH of FIG. 2, a porosity of less than about 10% by volume of said body and a thermal conductivity greater than 0.70

W/cm·K at 25° C. which consisting essentially of the steps:

(a) forming a mixture consisting essentially of an oxygen-containing aluminum nitride powder, gadolinium oxide or precursor therefor, and a carbonaceous additive selected from the group consisting essentially of free carbon, a carbonaceous organic material and mixture thereof, said carbonaceous organic material thermally decomposing at a temperature ranging from about 50° C. to about 1000° C. to free carbon and gaseous product of decomposition which vaporizes away, shaping said mixture into a compact, said mixture and said compact having a composition wherein the equivalent % of said gadolinium and aluminum ranges from point A to point F of FIG. 2, said gadolinium ranging from about 8.0 equivalent % to about 0.3 equivalent %, said aluminum ranging from about 92.0 equivalent % to about 99.7 equivalent % aluminum, said mixture and said compact having an equivalent % composition of Gd, Al, O and N outside the composition defined and encompassed by polygon ABCFGH of FIG. 2, (b) heating said compact in a nonoxidizing atmosphere at a temperature up to about 1200° C. thereby providing gadolinium oxide and free carbon, (c) heating said compact in a nitrogen-containing nonoxidizing atmosphere at a temperature ranging from about 1350° C. to a temperature sufficient to deoxidize the compact but below its pore closing temperature reacting said free carbon with oxygen contained in said aluminum nitride producing a deoxidized compact, said deoxidized compact having a composition wherein the equivalent % of Al, Gd, O and N is defined and encompassed by polygon ABCFGH of FIG. 2, said free carbon being in an amount which produces said deoxidized compact, and (d) sintering said deoxidized compact in a nitrogen-containing nonoxidizing atmosphere at a minimum temperature of about 1840° C. producing said polycrystalline body.

13. The process according to claim 12 wherein said nitrogen-containing atmosphere in step (c) contains sufficient nitrogen to facilitate deoxidation of the aluminum nitride to produce said sintered body.

14. The process according to claim 12 wherein said nitrogen-containing atmosphere in step (d) contains sufficient nitrogen to prevent significant weight loss of said aluminum nitride.

15. The process according to claim 12 wherein said process is carried out at ambient pressure.

16. The process according to claim 12 wherein said porosity is less than about 4% by volume of said body.

17. The process according to claim 12 wherein said mixture and said compact have a composition wherein the equivalent % of said gadolinium and aluminum ranges from point A up to point Q of FIG. 2, said gadolinium ranging from about 8.0 equivalent % to greater than about 0.55 equivalent % and said aluminum ranging from about 92.0 equivalent % to less than about 99.45 equivalent %, said mixture and said compact having an equivalent % composition of Gd, Al, O and N outside the composition defined and encompassed by polygon ABCQRS of FIG. 2, and said deoxidized compact and sintered body are comprised of a composition wherein the equivalent percent of Al, Gd, O and N is defined and encompassed by polygon ABCQRS excluding line CQ of FIG. 2.

18. The process according to claim 12 wherein said mixture and said compact have a composition wherein the equivalent % of said gadolinium and aluminum ranges from point I up to point Q but excludes line KQ of FIG. 2, said gadolinium ranging from about 5.75 equivalent % to greater than about 0.55 equivalent % and said aluminum ranging from about 94.25 equivalent % to less than about 99.45 equivalent %, said mixture and said compact having an equivalent % composition of Gd, Al, O and N outside the composition defined and encompassed by polygon IJKQRS of FIG. 2, and said deoxidized compact and sintered body are comprised of a composition wherein the equivalent percent of Al, Gd, O and N is defined and encompassed by polygon IJKQRS but excluding line KQ of FIG. 2.

19. The process according to claim 12 wherein said mixture and said compact have a composition wherein the equivalent % of said gadolinium and aluminum ranges from point M up to point Q of FIG. 2, said gadolinium ranging from about 3.75 equivalent % to greater than about 0.55 equivalent % and said aluminum ranging from about 96.25 eqiivalent % to less than about 99.45 equivalent %, said mixture and said compact having an equivalent % composition of Gd, Al, O and N outside the composition defined and encompassed by polygon MNOQRS of FIG. 2, said deoxidized compact and sintered body are comprised of a composition wherein the equivalent % of Al, Gd, O and N is defined and encompassed by polygon MNOQRS excluding line OQ of FIG. 2, and wherein said minimum sintering temperature is about 1850° C.

20. The process according to claim 12 wherein said mixture and said compact have a composition wherein the equivalent % of said gadolinium and aluminum ranges from point S up to point F of FIG. 2, said gadolinium ranging from about 2.4 equivalent % to greater than about 0.3 equivalent % and said aluminum ranging from about 97.6 equivalent % to less than about 99.7 equivalent %, said mixture and said compact having an equivalent % composition of Gd, Al, O and N, outside the composition defined and encompassed by polygon SRQFGH of FIG. 2, said deoxidized compact and sintered body are comprised of a composition wherein the equivalent percent of Al, Gd, O and N is defined and encompassed by polygon SRQFGH excluding line QF of FIG. 2, and wherein said minimum sintering temperature ranges from about 1890° C. to about 1920° C.

21. The process according to claim 12 wherein said mixture and said compact have a composition wherein the equivalent % of said gadolinium and aluminum ranges from point K to point O of FIG. 2, said gadolinium ranging from about 1.8 equivalent % to about 0.8 equivalent % and said aluminum ranging from about 98.2 equivalent % to about 99.2 equivalent %, said mixture and said compact having an equivalent % composition of Gd, Al, O and N outside the composition defined by line KO of FIG. 2, and said deoxidized compact and sintered body are comprised of a composition wherein the equivalent percent of Al, Gd, O and N is defined by line KO of FIG. 2.

22. The process according to claim 12 wherein said mixture and said compact have a composition wherein the equivalent % of said gadolinium and aluminum ranges from point O to point F of FIG. 2, said Gd ranging from about 0.8 equivalent % to about 0.3 equivalent % and said aluminum ranging from about 99.2 equivalent % to about 99.7 equivalent %, said mixture and said compact having an equivalent % composition of Gd, Al, O and N outside the composition defined by line OF, said deoxidized compact and said sintered body are comprised of a composition wherein the equivalent percent of Al, Gd, O and N is defined by line OF of FIG. 2, and wherein said minimum sintering temperature is about 1850° C.

* * * * *